H. P. SPENCER.
CANDY PULLER.
APPLICATION FILED MAR. 10, 1913.
1,102,174.
Patented June 30, 1914.
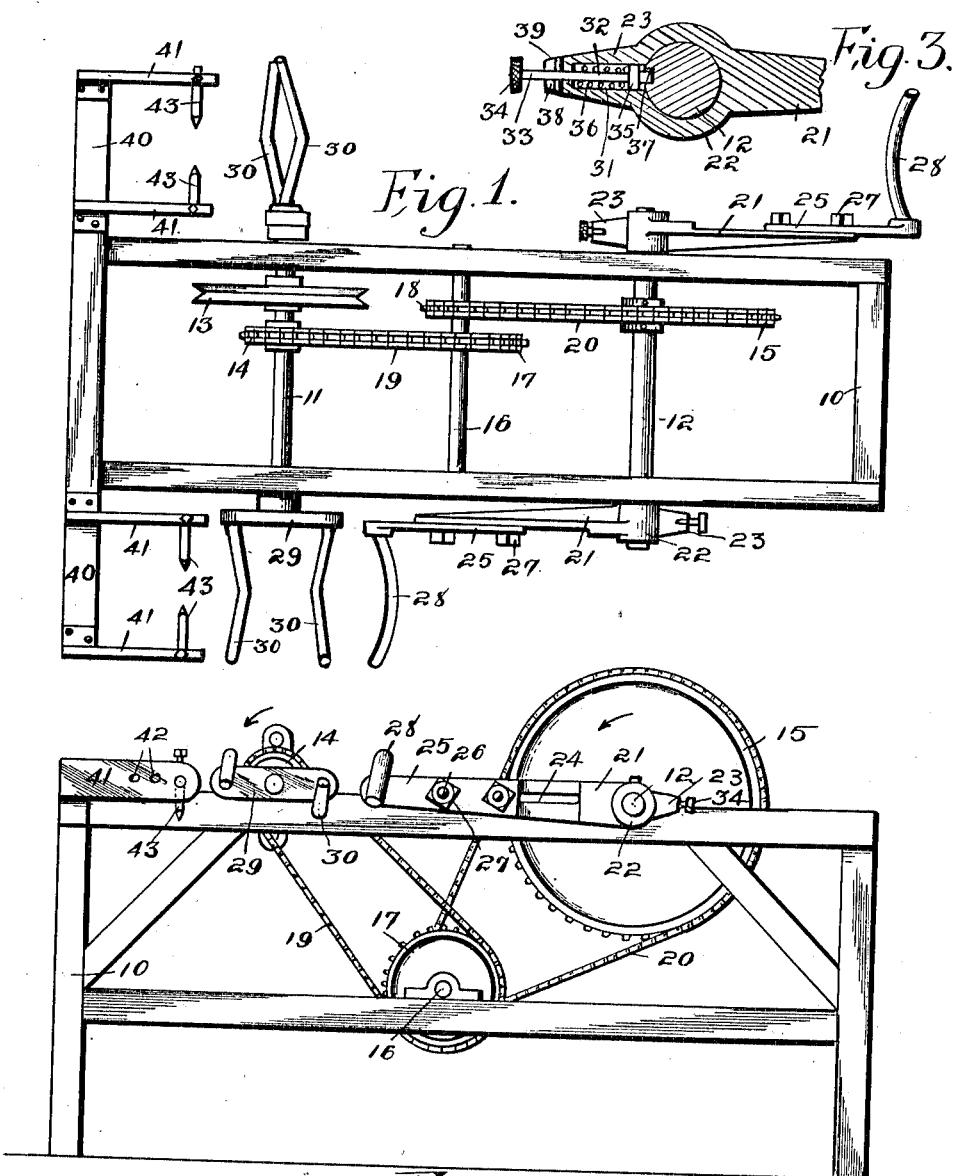
WITNESSES:
INVENTOR.
Harry P. Spencer
BY
Orwig & Bair
ATTORNEYS.

UNITED STATES PATENT OFFICE.

HARVEY P. SPENCER, OF DES MOINES, IOWA.

CANDY-PULLER.

1,102,174.   Specification of Letters Patent.   Patented June 30, 1914.

Application filed March 10, 1913. Serial No. 753,426.

*To all whom it may concern:*

Be it known that I, HARVEY P. SPENCER, a citizen of the United States, residing at Des Moines, in the county of Polk and State of Iowa, have invented a new and useful Candy-Puller, of which the following is a specification.

The object of my invention is to provide a candy puller of simple, durable and inexpensive construction.

A further object is to provide such a device provided with a shaft carrying two arms, spaced apart from each other, and of such construction and arrangement that when said arms are rotated they tend to constantly work the candy toward the central point by wrapping it around the arms.

A further object is to provide in connection with said arms a guide device for keeping the candy on said arms and for assisting in working it toward such central point.

A further object is to provide, in addition to the said pair of arms, another arm, rotated from a shaft and designed to pass in one point of its rotation close to but outside of circle of rotation of said pair of arms, the last described arm being adjustable so that it may be made to pass closer to or farther from said rotating pair of arms.

My invention consists in certain details, in the construction, combination and arrangement of the various parts of the device, whereby the objects contemplated are attained, as hereinafter more fully set forth, pointed out in my claim and illustrated in the accompanying drawings, in which—

Figure 1 shows a top or plan view of a candy pulling machine embodying my invention. Fig. 2 shows a side elevation of the same. Fig. 3 shows a sectional view of the clutch device.

In the accompanying drawings I have used the reference numeral 10 to indicate generally the frame which supports the operative mechanism of my improved candy pulling machine.

I provide two shafts 11 and 12 mounted on said frame 10 in suitable bearings. Rotary motion may be imparted to said shafts by any suitable means. In the drawings I have shown on the shaft 11 belt pulley 13 and sprocket wheel 14. I provide a counter shaft 16 on which are mounted sprockets 17 and 18. A chain 19 travels on the sprockets 14 and 17, and a chain 20 travels on the sprockets 18 and 15.

I preferably provide similar candy pulling mechanism on each side of my improved machine. I shall therefore described such mechanism as applied to one side of the machine only. The arm 21 is provided with a bearing 22, which is rotatably mounted on one end of the shaft 12.

It is important that means be provided whereby each arm 21 may be readily and easily thrown into and out of gear with the shaft 12. For accomplishing this purpose I have provided the following means. Formed on the bearing 22 opposite the arm 21 is an approximately cylindrical extension 23, in which is a cylindrical opening 31, communicating at its inner end with the opening which receives the shaft 12. The outer end of the opening 31 is contracted at 32. Slidably received in the openings 31 and 32 is a stem 33, on which is a head 34. Mounted on the stem 33 near the inner end thereof is a collar 35. Mounted on the stem 33 between the collar 35 and the contracted portion 32 of the opening in the extension 23 is an expansible coil spring 36, designed to hold the stem 33 at the inward position of its movement. In a shaft 12 is a recess 37 designed to receive the end of the stem 33. In the outer end of the extension 23 is a transverse slot 38. Extending through the stem 33 near the head 34 is a transverse pin 39. When the stem 33 is drawn outwardly, its inner end is withdrawn from slot or opening 37, and by rotating the stem 33 slightly the pin 39 may be caused to rest against the outer end of the extension 23. The stem 33 may be rotated until the pin 39 registers with slot 38, when the spring 36 will force the stem 33 inwardly and cause the end of said stem to enter the opening 37 as the shaft 12 rotates, thereby causing the arm 21 to rotate with said shaft 12. The importance of some means for accomplishing the purpose of the mechanism just described will be hereinafter more fully set forth.

The arm 21 is provided with a longitudinal elongated slot 24. Another arm 25 is adjustably secured to the arm 21 by means of bolts 26, and nuts 27. On the outer or free end of the arm 25 is a laterally extending curved arm 28 clearly shown in Fig. 2.

On each end of the bar 29 is an outwardly extending arm 30. The arms 30 are preferably curved as shown in Fig. 1 in opposite directions. They are also preferably so mounted on the bar 29 that when the bar 29 is in a horizontal position as shown in the lower part of Fig. 1, the said arms 30 lie in substantially parallel planes. In other words one of the arms 30, when the bar 29 is in a horizontal position is curved from the bar upwardly and outwardly and then downwardly and outwardly (see left hand arm 30 in Fig. 2) and the other arm 30 is curved downwardly and outwardly, and then upwardly and outwardly (see right hand arm 30 in Fig. 2). The arms 30 are also preferably so mounted on the bar 29 that the left hand arm as shown in Fig. 2 inclines upwardly toward a vertical plane in which shaft 11 lies, and the right hand arm 30 inclines downwardly and toward the said plane.

Secured to the frame of my machine near the upper part thereof, on the end adjacent to the shaft 11 are laterally extending arms 40. Carried by each arm 40 is a pair of parallel arms 41 extending toward the arms 30. In each of the arms 41 I provide a plurality of openings 42. Selectively mounted in the openings 42 are guide pins 43, which are inclined downwardly and toward each other.

I will now describe the practical operation of my improved candy pulling machine. It will be understood that the gear mechanism for operating the various shafts may be varied as desired and that the gear mechanism shown is simply for the purpose of illustration. Assuming that the pulley 13 is connected with a suitable source of power such as an electric motor, or a gasoline engine, I place a batch of candy on the arms 30. With most of the candies which are pulled, it is highly desirable to work the candy for a short time on the arms 30 before the arm 28 is operated. The candy does not stick or pull well on the arm 28 if that arm is operated as soon as the candy is put on the machine. I disconnect the arm 21 with shaft 12 by drawing the stem 33 outwardly and rotating it until the pin 39 rests against the outer end of the extension 23 where it is held by friction. I can then work with the candy on the arms 30 without danger of being struck by the arm 28, and the candy will be worked by the arm 30 for a short time, until it is in condition to be pulled by the arm 28. After the candy has been worked by the arms 30 for a short time, I turn the stem 33 until the pin 39 is received in the slot 38 and the end of the stem 33 enters the opening 37. The arms 30 rotate in the direction indicated by the arrow above said arms in Fig. 2, and the arm 28 rotates in the direction indicated by the arrow on the wheel 15 in Fig. 2. As the arm 28 passes the arms 30 it strikes the ball of candy and in its further rotation pulls the candy into a long string. The rotation of the arms 30 also stretches the candy into a thinner string until the arm 25 is extended away from the shaft 12 in the opposite direction from the shaft 11. As the rotation of the arm 28 continues, the arms 30 wind the string of candy into a ball again. This operation is continued until the candy is pulled.

I believe that my candy pulling machine produces better results than any other machine for the following reasons: The arms 30 are mounted comparatively close together on the bar 29 at equal distances from shaft 11, which allows said arms 30 to be revolved rapidly without centrifugal force deflecting the candy being worked, and such deflection would result were said arms 30 mounted farther apart and revolved at the same speed. Existing candy machines with a similar double arm arrangement have the arms mounted a sufficient distance apart to allow another revolving arm to pass in between said arms, or to stretch the candy over a stationary arm placed between the moving arms, necessitating relatively slow speed.

It is one of the purposes of the candy pulling machine to thoroughly aerate the candy. When arms 30 and arms 28 have the candy pulled into a long string, as above described, the rapid action of arms 30 quickly rolls the string of candy into a ball, lapping one fold upon top of the other. The surface of candy when pulled into a string is more or less rough, containing interstices or air cells. The arms 30 quickly roll the string of candy into a ball, the air in the interstices or air cells is caught and retained in the folds of the candy, and the continuous rapid pulling action of arms 30 and the intermittent pulling action of arm 28 forced into and through the candy the air thus caught and retained, thereby producing rapid and thorough aeration. My machine is preferably geared so that the arms 30 make about five revolutions to one of arm 28, the resultant action being such as to alternately and rapidly expose to the air relatively large surface area of the candy being pulled and to quickly mass it into a ball again. The shape of the arms 30 and the angle at which they are preferably mounted on the bar 29 constantly tends to draw the candy toward the middle point between the centers of arms 30. The guide fingers 43 also assist in holding the candy in the middle of the arms 30. It will be readily seen that the combined length of arms 21 and 25 may be varied and the position of the guide pins 43 may be changed for making different sized batches of candy.

I am aware that there are machines now in use having slow moving intertwining arms, or one or more stationary arms intersecting the path of one or more revolving or reciprocating arms, but I prefer to use the comparatively rapidly rotating arms 30 and the single rotating arm 28, the last named arm 28 not intersecting the circle of rotation of the two first named arms 30. My machine is very simple of construction, can be built cheaply and durable and operated in less space than the larger intertwining arm machines.

Many variation made be made in the details of construction of my candy pulling machine without departing from its essential features.

It is my purpose to cover by this application for patent any variations in the structure of my device coming within the scope of the appended claims.

I claim as my invention,

1. In a device of the class described, a frame, first and second parallel shafts rotatably mounted thereon, a bar centrally mounted on one end of the first shaft at right angles thereto, arms extending outwardly from the ends of said bar, said arms being comparatively close together, a longer arm on said second shaft at right angles thereto, an arm extending outwardly from said longer arm, the length of said longer arm being such that it passes near but does not intersect the paths of rotation of the arms on said bar.

2. In a device of the class described, a frame, first and second parallel shafts rotatably mounted thereon, a bar secured between its ends and at right angles to the end of the first shaft, arms extending outwardly from each end of said bar, said arms lying comparatively close together, a longer arm extending at right angles from the second shaft, an arm extending outwardly from the end of said longer arm, said shafts and arms being so arranged that the last named arm in one position of its rotation approaches close to but does not intersect the paths of rotation of said first arms, and guide pins arranged near the paths of rotation of the first two arms, for engaging candy carried by the arms and moving it toward the center thereof.

3. In a device of the class described, a frame, first and second parallel shafts rotatably mounted thereon, a bar secured between its ends and at right angles to the end of the first shaft, arms extending outwardly from each end of said bar, said arms lying comparatively close together, a longer arm extending at right angles from the second shaft, an arm extending outwardly from the end of said longer arm, said shafts and arms being so arranged that the last named arm in one position of its rotation approaches close to but does not intersect the paths of rotation of said first arms, and guide pins arranged near the paths of rotation of the first two arms, for engaging candy carried by the arms and moving it toward the center thereof, said first two arms being curved and arranged so that when each of the first two arms is nearest the guide pins the curved center thereof is upward.

4. In a device of the class described, a frame, first and second parallel shafts rotatably mounted thereon, a bar centrally mounted on one end of the first shaft at right angles thereto, arms extending outwardly from the ends of said bar, said arms being comparatively close together, a longer arm on said second shaft at right angles thereto, an arm extending outwardly from said longer arm, the length of said longer arm being such that it passes near but does not intersect the paths of rotation of the arms of said bar, the arm on said longer arm being curved and so arranged that its curved center is upward when nearest the first arms, and means for rotating the second shaft to make the longer arm move downwardly and away from its position nearest the first two arms.

5. In a candy pulling machine, a frame, parallel shafts mounted thereon, spaced arms mounted on one shaft, an arm on the other shaft at right angles thereto, longer than the distance between said first arms, an arm on said longer arm arranged to pass near to but not to intersect the paths of rotation of the first arms, and means for imparting motion to said arms so that the relative speeds of the first arms and of the last described arm are such as to properly coil and stretch the candy.

Des Moines, Iowa, March 5, 1913.

HARVEY P. SPENCER.

Witnesses:
W. G. SHANKS,
MRS. L. SULLIVAN.

---

Copies of this patent may be obtained for five cents each, by addressing the "Commissioner of Patents, Washington, D. C."